(12) United States Patent
Koehler et al.

(10) Patent No.: US 11,512,668 B2
(45) Date of Patent: Nov. 29, 2022

(54) MULTI-PULSE SOLID ROCKET MOTOR IGNITION METHOD

(71) Applicant: Raytheon Company, Waltham, MA (US)

(72) Inventors: Frederick B. Koehler, Tucson, AZ (US); Jacob A. Pinello-Benavides, Vail, AZ (US); Curtis S. Copeland, Tucson, AZ (US); Isaiah M. McNeil, Sahuarita, AZ (US); Paul Kadlec, Vail, AZ (US); Lauren E. Brunacini, Tucson, AZ (US); Mark T. Langhenry, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/106,089

(22) Filed: Nov. 28, 2020

(65) Prior Publication Data

US 2022/0170432 A1    Jun. 2, 2022

(51) Int. Cl.
*F02K 9/95* (2006.01)
*F02K 9/28* (2006.01)
*F02K 9/38* (2006.01)
*F02K 9/94* (2006.01)

(52) U.S. Cl.
CPC .................. *F02K 9/95* (2013.01); *F02K 9/28* (2013.01); *F02K 9/38* (2013.01); *F02K 9/94* (2013.01)

(58) Field of Classification Search
CPC ..... F02K 9/10; F02K 9/22; F02K 9/26; F02K 9/28; F02K 9/94; F02K 9/95
See application file for complete search history.

(56) References Cited

U.S. PATENT DOCUMENTS

| 10,107,601 | B2 * | 10/2018 | Villarreal | F02K 9/28 |
| 10,563,617 | B2 * | 2/2020 | Villarreal | F02K 9/26 |
| 2010/0107601 | A1 * | 5/2010 | Valentian | F02K 9/95 60/257 |
| 2011/0259230 | A1 | 10/2011 | Sawka | |

(Continued)

OTHER PUBLICATIONS

International Search Report and Written Opinion in corresponding International Application No. PCT/US2021/027596.

*Primary Examiner* — Todd E Manahan
*Assistant Examiner* — Kyle Robert Thomas
(74) *Attorney, Agent, or Firm* — Renner, Otto, Boisselle & Sklar, LLP (57) ABSTRACT

A rocket motor has an electrically operated propellant initiator for a propellant grain that includes an electrode arrangement configured to concentrate an electric field at an ignition electrode for igniting an electrically operated propellant. The rocket motor includes a combustion chamber containing at least one propellant grain and an electrically operated propellant initiator operatively coupled to the propellant grain to initiate combustion of the propellant grain. The electrically operated propellant initiator includes the electrically operated propellant and at least one pair of electrodes configured to ignite the electrically operated propellant. The pair of electrodes includes a ground plane electrode and an ignition electrode. When an electrical input is applied to the electrically operated propellant initiator, the electric field is concentrated at the ignition electrode to ignite the electrically operated propellant at the location where the ignition electrode is arranged.

16 Claims, 4 Drawing Sheets

(56) References Cited

U.S. PATENT DOCUMENTS

2015/0047526 A1* 2/2015 Sawka .................. F02K 9/95
                                                    102/374
2017/0097213 A1* 4/2017 Villarreal ............... F02K 9/95
2018/0128207 A1* 5/2018 Villarreal ............... F02K 9/12

* cited by examiner

FIG. 8

MULTI-PULSE SOLID ROCKET MOTOR IGNITION METHOD

GOVERNMENT LICENSE RIGHTS

This invention was made with Government support under contract number FA8651-18-F-1016, awarded by the Department of Defense. The Government has certain rights in the invention.

FIELD OF INVENTION

The invention relates to thrust systems for flight vehicles, and more particularly to multi-pulse rocket motors.

DESCRIPTION OF THE RELATED ART

Various applications require payloads that are launched from a mission suitable platform, such as a land, sea, air, or space vehicle. The payload to be launched is dependent on the application. Military applications that use land vehicles, aircrafts, surface ships, or underwater vehicles may use deployable munitions as payloads. The payloads may be carried by a flight vehicle including a rocket motor having multiple pulses which enables non-continuous propulsion, different propulsive forces, and backup pulses without requiring completely separate rocket motor stages.

The propellant grains for each pulse may be separated by an inert barrier that prevents the subsequent pulses from igniting due to contact with combustion gases formed from another burning propellant grain. When the propellant grain is ignited, the force of the generated combustion gases breaks through the barrier to expel thrust gases from the projectile until the propellant of the pulse burns out. At least one igniter is used to ignite each propellant pulse.

Conventional multi-pulse rocket motors can be deficient in that the rocket motors may have complicated barrier and igniter systems between the pulses that are difficult and costly to manufacture. One possible deficiency of conventional barriers is that the barrier may be ejected or inverted which may lead to clogging of the nozzle in the rocket motor or combustion instability. Still another disadvantage of conventional multi-pulse rocket motors is that they may be limited to two pulses.

SUMMARY OF THE INVENTION

The present application provides a rocket motor having an electrically operated propellant initiator for a propellant grain that includes an electrode arrangement configured to concentrate an electric field at an ignition electrode for igniting an electrically operated propellant. According to a general embodiment, the rocket motor includes a combustion chamber containing at least one propellant grain and an electrically operated propellant initiator operatively coupled to the propellant grain to initiate combustion of the propellant grain. The electrically operated propellant initiator includes the electrically operated propellant and at least one pair of electrodes configured to ignite the electrically operated propellant. The pair of electrodes includes a ground plane electrode and an ignition electrode. When an electrical input is applied to the electrically operated propellant initiator, the electric field is concentrated at the ignition electrode to ignite the electrically operated propellant at the location where the ignition electrode is arranged.

The rocket motor including the electrically operated propellant initiator with the electrode configuration is advantageous in that the electrodes can be arranged to control the location of the burn such that expeditious and uniform propellant grain ignition is enabled. Accordingly, the configuration is less complex and more robust as compared with conventional barrier and igniter systems.

The electrically operated propellant is configured to transition from an unignited state to an ignited state when electrical input is applied across the electrically operated propellant initiator, and is configured to maintain the unignited state when the electrical input is not applied. The ignition electrode has a greater current density than the ground plane electrode. A ratio of the propellant grain surface area covered by the ground plane electrode relative to the surface area covered by the ignition electrode may be at least 2:1. At least the ignition electrode is formed of a refractory metal or refractory alloy.

The electrodes may be embedded in the electrically operated propellant and arranged in the same or different planes that are parallel to an outer surface of the propellant grain that is adjacent the electrically operated propellant. Many different configurations of the electrodes are possible. The ignition electrode may be arranged in a cavity formed in the propellant grain such that the electric field is directed into the cavity. In other embodiments, the ignition electrode and the ground plane electrode may be arranged in a same plane such that the electric field is directed laterally across the outer surface of the propellant grain.

In exemplary embodiments, the electrodes may be formed of wires having a serpentine, zig-zag, crisscross, diagonal, parallel, non-parallel, etc., arrangement. The wires may extend in a radial direction. The ignition electrode wires and the ground plane electrode wires may be formed in a non-overlapping arrangement. The ignition electrode wires may intersect each other and/or the ground plane electrode wires may intersect each other.

The rocket motor may be a single pulse rocket motor having a single propellant grain or a multi-pulse rocket motor having two, three, or more pulses that each have a corresponding propellant grain. The electrically operated propellant initiator can also act as a barrier that isolates the propellant grains from each other such that the propellant grain can be individually initiated. More than one electrically operated propellant initiator may be provided.

According to an aspect of the invention, a gas generation system for a rocket motor includes an electrically operated propellant initiator for a propellant grain.

According to an aspect of the invention, an electrically operated propellant initiator includes an electrode arrangement in which the electrodes cover different amounts of surface areas of the propellant grain to concentrate an electric field at certain points within the electrode configuration.

According to an aspect of the invention, an electrically operated propellant initiator includes an ignition electrode and a ground plane electrode.

According to an aspect of the invention, an electrically operated propellant initiator for a propellant grain includes an electrode arrangement that is embedded in an electrically operated propellant.

According to an aspect of the invention, a multi-pulse rocket motor includes an electrically operated propellant initiator that acts as an initiator and barrier to operatively isolate propellant grains for different pulses.

According to an aspect of the invention, a rocket motor includes a pulse chamber containing at least one propellant grain, and an electrically operated propellant initiator operatively coupled to the at least one propellant grain to initiate combustion of the at least one propellant grain, the electrically operated propellant initiator including an electrically operated propellant and at least one pair of electrodes arranged to ignite the electrically operated propellant, the at least one pair of electrodes including a ground plane electrode and an ignition electrode at which an electric field is concentrated to ignite the electrically operated propellant.

According to an embodiment of any paragraph(s) of this summary, the ignition electrode has a greater current density than the ground plane electrode.

According to an embodiment of any paragraph(s) of this summary, the ground plane electrode extends along a first surface area of the at least one propellant grain that is larger than a second surface area of the at least one propellant grain along which the ignition electrode extends.

According to an embodiment of any paragraph(s) of this summary, a ratio of the first surface area to the second surface area is at least 2:1.

According to an embodiment of any paragraph(s) of this summary, the ground plane electrode is formed of wires having a first diameter that is larger than a second diameter of wires forming the ignition electrode.

According to an embodiment of any paragraph(s) of this summary, the at least one pair of electrodes are formed of a plurality of wires having a zig-zag, diagonal, crisscross, rectangular, parallel, non-parallel, or serpentine arrangement.

According to an embodiment of any paragraph(s) of this summary, the at least one pair of electrodes are separately arranged without crossing each other.

According to an embodiment of any paragraph(s) of this summary, the at least one propellant grain has at least one cavity in which at least one of the ignition electrode and the ground plane electrode is arranged.

According to an embodiment of any paragraph(s) of this summary, the ignition electrode and the ground plane electrode are arranged in a same plane that is parallel with an outer surface of the at least one propellant grain.

According to an embodiment of any paragraph(s) of this summary, the ignition electrode and the ground plane electrode are arranged in different planes.

According to an embodiment of any paragraph(s) of this summary, the ignition electrode is formed of a refractory metal or refractory alloy.

According to an embodiment of any paragraph(s) of this summary, the rocket motor is a multi-pulse rocket motor and the at least one propellant grain includes a first propellant grain and a second propellant grain that is burned during a second pulse of the multi-pulse rocket motor, the second propellant grain being operatively isolated from the first propellant grain via the electrically operated propellant initiator whereby the first propellant grain and the second propellant grain are individually initiated.

According to an embodiment of any paragraph(s) of this summary, the at least one propellant grain includes a third propellant grain that is burned during a third pulse of the multi-pulse rocket motor, the third propellant grain being operatively isolated from the second propellant grain via another electrically operated propellant initiator.

According to an embodiment of any paragraph(s) of this summary, the electrically operated propellant is configured to transition from an unignited state to an ignited state when electrical input is applied across the electrically operated propellant initiator, and is configured to maintain the unignited state when the electrical input is not applied.

According to an embodiment of any paragraph(s) of this summary, the rocket motor includes a power source and a pair of leads extending from the power source to the electrically operated propellant initiator.

According to another aspect of the invention, a multi-pulse rocket motor includes a first pulse containing a first propellant grain, a second pulse containing a second propellant grain operatively isolated from the first propellant grain, and at least one electrically operated propellant initiator configured to isolate the first propellant grain and the second propellant grain, the at least one electrically operated propellant initiator being configured to initiate combustion of the first propellant grain or the second propellant grain, with the at least one electrically operated propellant initiator including an electrically operated propellant and at least one pair of electrodes that are configured to ignite the electrically operated propellant, the at least one pair of electrodes including a ground plane electrode and an ignition electrode, the ground plane electrode extending along a first surface area of the second propellant grain that is larger than a second surface area of the second propellant grain along which the ignition electrode extends, the ignition electrode having a greater current density than the ground plane electrode whereby an electric field is concentrated at the ignition electrode.

According to an embodiment of any paragraph(s) of this summary, the multi-pulse rocket motor includes a third pulse containing a third propellant grain operatively isolated from the first propellant grain and the second propellant grain, wherein the at least one electrically operated propellant initiator includes a first electrically operated propellant initiator configured to isolate the first propellant grain and the second propellant grain and a second electrically operated propellant initiator configured to isolate the second propellant grain and the third propellant grain.

According to an embodiment of any paragraph(s) of this summary, a ratio of the first surface area to the second surface area is at least 2:1.

According to still another aspect of the invention, a method of operating a rocket motor includes applying an electrical input across an electrically operated propellant initiator that is operatively coupled to a propellant grain and includes an electrically operated propellant and at least one pair of electrodes, the at least one pair of electrodes including a ground plane electrode and an ignition electrode, igniting the electrically operated propellant by an electric field being concentrated at the ignition electrode, and initiating combustion of the propellant grain via igniting the electrically operated propellant.

According to an embodiment of any paragraph(s) of this summary, the method includes maintaining operative isolation of the propellant grain from a second propellant grain of a second propulsion pulse for the rocket motor, providing a second propulsion pulse for the rocket motor by applying another electrical input across a second electrically operated propellant initiator subsequent to the electrically operated propellant initiator that is operatively coupled to the propellant grain, the second electrically operated propellant initiator being operatively coupled to the second propellant grain, igniting a second electrically operated propellant of the second electrically operated propellant initiator, and initiating combustion of the second propellant grain via igniting the second electrically operated propellant.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have application in defense applications, such as in a hypersonic vehicle or in any flight vehicle where space may be constrained. The rocket motor described herein may be implemented in any suitable flight vehicle or projectile. Single-pulse or multi-pulse rocket motors may be suitable. The rocket motor may be part of a missile that is suitable for carrying a payload. For example, the missile may include a payload module for carrying a munition for a military application. The rocket motor includes a gas generation system described herein for generating combustion gases that propel the munition. In other exemplary embodiments, the gas generation system may be used for other purposes, such as to drive a turbine, to operate a pressure driven mechanical device, to provide tank gas pressurization, etc.

Figure 1:
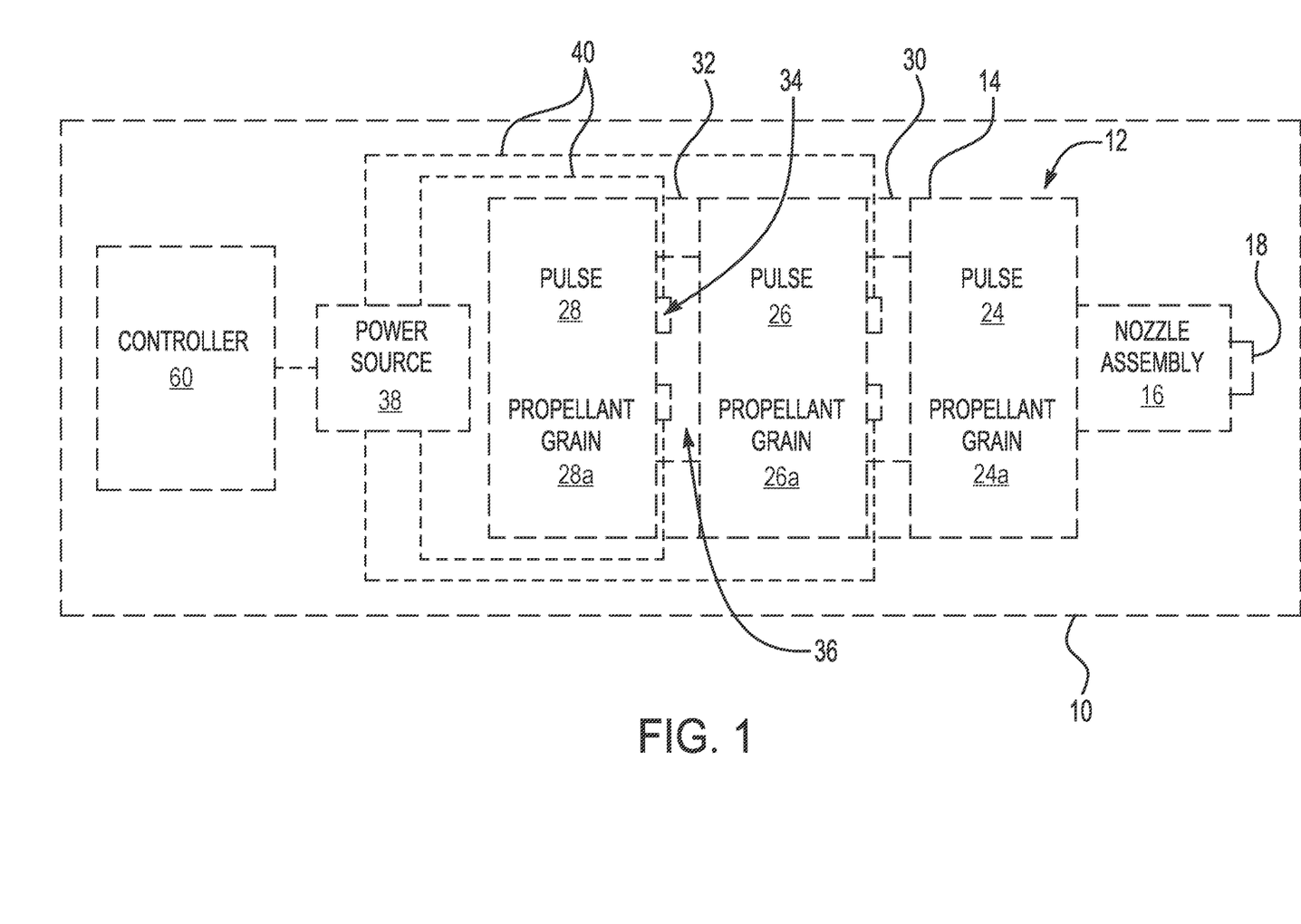
FIG. 1 schematically shows a solid rocket motor containing propellant grain segments that are separated by electrically operated propellant initiators.

Referring first to FIG. 1, a projectile 10 includes a rocket motor 12 for generating gases to drive movement of the projectile 10. The projectile 10 includes a body having a chamber or casing 14 for the rocket motor 12. The rocket motor 12 includes a nozzle assembly 16 having a nozzle opening 18 for expelling propellant gases generated from the rocket motor 12. The rocket motor 12 is a solid rocket motor including the casing 14, at least one pulse 24, 26, 28 containing a propellant charge or grain 24a, 26a, 28a, and at least one initiator 30, 32. The initiator 30, 32 is configured to ignite at least one of the propellant grains 24a, 26a, 28a to produce thrust during the corresponding pulse 24, 26, 28.

The rocket motor 12 may be a single pulse motor having only one pulse or a multi-pulse rocket motor having two, three, or more pulses 24, 26, 28. In an exemplary embodiment, the pulses 24, 26, 28 may be formed in a single chamber or casing 14. Other configurations of the pulses 24, 26, 28 and propellant grains 24a, 26a, 28a may be suitable, as required for a particular application. In addition to initiating the propellant grain 24a, 26a, 28a, the initiators 30, 32 are also configured to act as a barrier between the propellant grain 24a, 26a, 28a. Accordingly, isolated initiation of the propellant grain 24a, 26a, 28a is enabled to provide pulses that may be fired separately from one another, meaning that an adjacent propellant grain 24a, 26a, 28a cannot be ignited due to gases generated from the combustion of other propellant grain 24a, 26a, 28a.

The casing 14 is configured to enable expulsion of combustion gases from the casing interior. The casing 14 may have any suitable shape, such as a cylindrical shape that is useful in a projectile application. The casing 14 may be formed from any suitable material for containing burning combustion gases at high pressures and high temperatures. For example, the casing may be formed of an inert material that is not ignitable during normal use of the rocket motor 12.

The propellant grains 24a, 26a, 28a are provided for being ignited and combusted to generate high pressure gases for being used to propel or move an object or to pressurize a container, for example. The propellant grain 24a, 26a, 28a may be solid, single pieces having any shape or form, such as core burning, slotted core, rod and tubes, pellets, grains, etc. The propellant grain 24a, 26a, 28a may be made from any suitable material or materials, including fuels, oxidizers, binders, plasticizers, metallic additives, etc. Each of the propellant grain 24a, 26a, 28a may be made of different materials, have different form, or have different shape and/or size than the other propellant grain. End burning grain and center-perforated grain may be suitable. Other fluted grain configurations are also suitable. The propellant grain 24a, 26a, 28a may be isolated from one another. In other exemplary embodiments, additional grain or pulses may or may not be separately isolated.

As shown in FIG. 1, the propellant grain 24a, 26a for the first and second pulses 24, 26 are isolated from one another via a first initiator 30 of the two initiators 30, 32, and the propellant grain 26a, 28a for the second and third pulses 26, 28 are isolated from one another via a second initiator 32. In exemplary embodiments, only one initiator may be provided, and in still other exemplary embodiment, more than two initiators 30, 32 may be provided. For example, the initiation of an initiator may cause combustion of more than one propellant grain. The initiators 30, 32 are operatively coupled to respective ones of the propellant grain 26a, 28a, to initiate combustion in the propellant grain 26a, 28a. Coupling may include direct coupling, such as via an initiator 30, 32 being proximate or contiguous with the propellant grain 26a, 28a. In addition to the isolation provided via the initiators 30, 32, in other embodiments, one or more propellant grain may be isolated from other propellant grain via a casing wall or another inert material that is not ignitable during normal use of the rocket motor 12. The propellant grain 24a for the first pulse 24 may also be initiated by another initiator in other exemplary embodiments.

Initiation, such as ignition, of the initiator 30, 32 will generate heat and/or a flame front that is great enough to ignite the corresponding propellant grain 26a, 28a. The initiator 30, 32 includes at least one pair of electrodes 34 configured to ignite an electrically operated propellant 36. The electrically operated propellant 36 may be applied over the propellant grain 26a, 28a. One or more pairs of electrodes 34 may be used. In exemplary embodiments, the pair of electrodes 34 may be embedded in the electrically operated propellant 36. The initiator 30, 32 may extend radially outwardly from a center longitudinal axis of the casing 14 to seal against the inner surface of the casing 14. Accordingly, the initiator 30, 32 serves as a barrier between the propellant grain 26a, 28a and an environment external to the rocket motor 12, while also providing structural support to retain the propellant grain 26a, 28a in the casing 14. In other embodiments, the initiator 30, 32 may have any other suitable shape.

The initiators 30, 32 may have a circular or cylindrical shape to fit within the cylindrical casing 14. This circular shape may be provided in the form of thin sheets of material. The thin sheets may have sufficient thickness to account for degradation of a surface of the initiator 30, 32 when not ignited but still exposed to high heat and combustion environments within the casing 14. For example, combustion of the propellant grain 26a, 28a may cause high heat in the casing 14, which will not ignite the electrically operated propellant of the auxiliary initiator 32 when an electrical input is not applied across the auxiliary initiator 32. A thin portion of the auxiliary or secondary initiator 32 exposed to the high heat and combustion environment may be configured to degrade. The initiators 30, 32 may have any suitable shape to provide operative isolation of the propellant grain 26a, 28a from one another.

The electrically operated propellant 36, and thus the initiators 30, 32, are configured to ignite in response to an electrical input and to generate gas when ignited, such that the initiators 30, 32 form a gas generation system for the rocket motor 12. The electrically operated propellant 36 is configured to transition from an unignited state to an ignited state when a respective electrical input is applied across the initiator 30, 32 between the pair of electrodes 34. The electrically operated propellant 36 is also configured to maintain the unignited state when the electrical input is not applied.

An exemplary electrically operated propellant 36 ignites with the application of electricity and correspondingly extinguishes with the cessation of electricity, even when exposed to high pressures, though below a high pressure threshold. For example, when exposed to ambient or high pressures within the casing 14, such as atmospheric pressure, pressures greater than 120 psi, 500 psi, 1000 psi, 1200 psi and up to 1500 psi, the electrically operated propellant 36 is extinguished with the interruption of electricity (e.g., voltage or current) applied across the electrically operated propellant.

Exemplary embodiments of the electrically operated propellant 36 include a propellant having a plurality of components such as an oxidizer, a fuel, and a binder. The electrically operated propellant 36 may include between approximately 50 and 90 percent by mass of an oxidizer, such as a perchlorate based oxidizer. The perchlorate based oxidizer may include perchlorate based oxidizers such as aluminum perchlorate, barium perchlorate, calcium perchlorate, lithium perchlorate, magnesium perchlorate, perchlorate acid, strontium perchlorate, sodium perchlorate and the like. The electrically operated propellant 36 may include approximately 5 to 30 percent by mass of fuel, such as a metal based fuel that assists in the ignition and extinguishing of the electrically operated propellant 36. The metal based fuel may include tungsten, magnesium, copper oxide, copper, titanium and aluminum. Many other configurations of the electrically operated propellant 36 may be suitable.

The electrically operated propellant 36 is also configured to maintain its shape when exposed to dynamic kinematic conditions in the rocket motor 12. The electrically operated propellant 36 may be formable, e.g. cast or molded, into any number of grain configurations. Accordingly, the burn rate and other performance characteristics of the electrically operated propellant 36 are maintained throughout the operation of the rocket motor 12. Exemplary performance characteristics include total impulse value, ignition rise time, peak pressure, and weight propellant density.

As shown in FIG. 1, a power source 38 is provided to generate the electrical input for igniting the initiators 30, 32. A pair of leads 40 electrically couples each of the initiators 30, 32 to the power source 38. The leads 40 extend between the respective initiators 30 and 32 and the power source 38, which may be a battery or any other suitable device capable of generating electrical input. The leads 40 may be wires, such as insulated wires having materials capable of withstanding the high heat generated in the rocket motor 12. In other embodiments, more than one power source 38 may be included and more than one pair of leads 40 may provide electrical input across one or more of the initiators 30, 32.

For each of the electrically operated propellant initiators 30, 32, the pair of electrodes 34 couples the respective initiator to the respective pair of leads 40. As shown in FIG. 1, one of the electrodes of the pair of electrodes 34 is coupled between a lead 40 of the pair of electrodes 34 and the initiator 30, 32. The electrodes 34 are configured to allow control of the particular location or portion of the initiator 30, 32 that is ignited, the speed at which the initiator 30, 32 burns, and the intensity of the burn.

Figure 2:
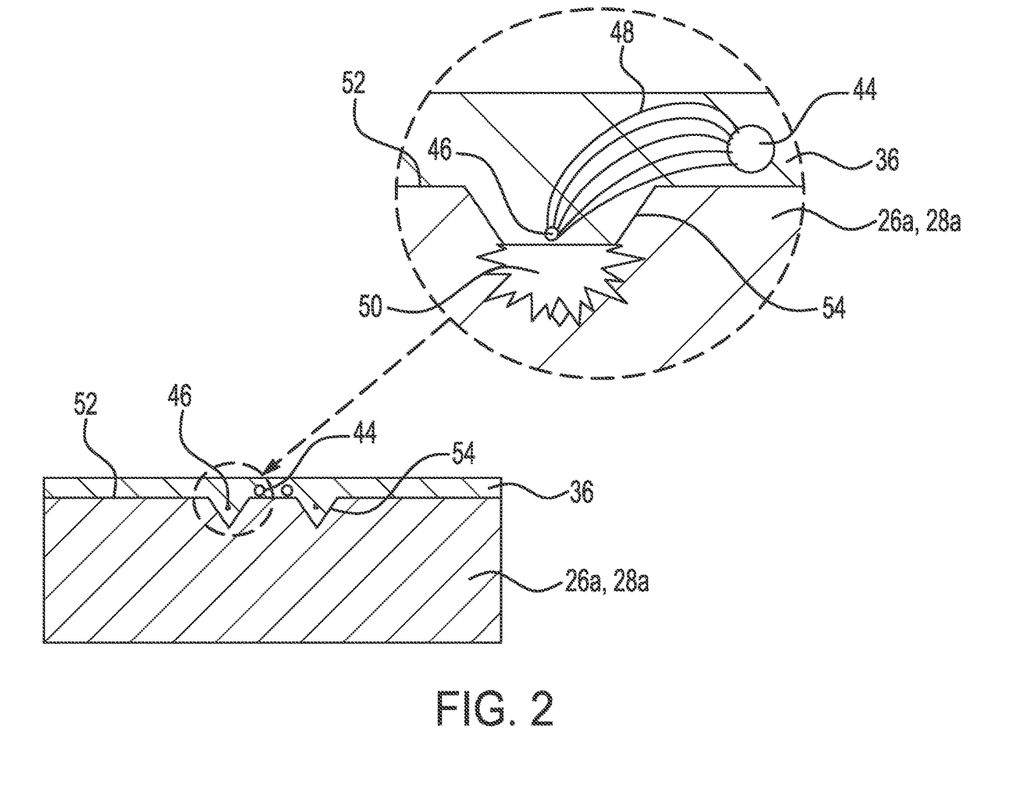
FIG. 2 shows the electrically operated propellant initiator including an ignition electrode and a ground plane electrode.
Figure 3:
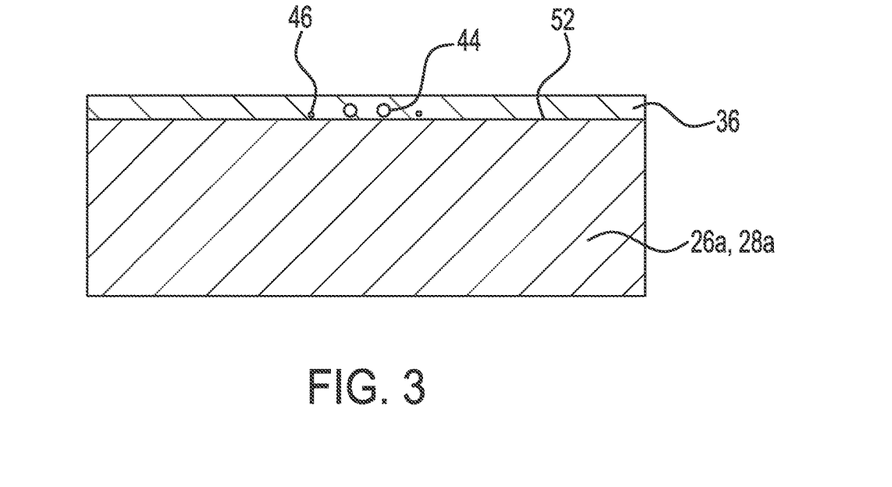
FIG. 3 shows a configuration of the ignition electrode and the ground plane electrode according to another exemplary embodiment of the present application.

Referring now to FIGS. 2 and 3, one of the pair of electrodes 34 is a ground plane electrode 44 and the other of the pair of electrodes 34 is an ignition electrode 46 that are configured such that an electric field 48 of the electrical input is concentrated at the ignition electrode 46 to ignite the electrically operated propellant 36 at the location where the ignition electrode 46 is arranged. The ground plane electrode 44 extends along a first surface area of the propellant grain 26a, 28a that is greater than a second surface area of the propellant grain 26a, 28a along which the ignition electrode 46 extends. The ignition electrode 46 has a greater current density as compared with the ground plane electrode 44, which is defined as the amount of electric current per unit area of cross section, as compared with the ground plane electrode 44. The ratio of the covered surface area of the propellant grain 26a, 28a from the ground plane electrode 44 to the ignition electrode 46 may be at least 2:1.

The ground plane electrode 44 may be formed of wires having a diameter that is larger than the diameter of the wires of the ignition electrode 46. For example, the diameter of the wires of the ground plane electrode 44 may be between 0.12 and 1.27 millimeters (between 0.005 and 0.05 inches), and the wires of the ignition electrode 48 may have a diameter that is between 0.002 and 0.635 millimeters (between 0.0001 and 0.025 inches. The wires may have any other suitable dimensions and may be sized up or down depending on the application. During ignition, the electrical input will flow between the electrodes 44, 46 and the electric field 48 will be concentrated at the ignition electrode 46. An electrochemical reaction ignition 50 occurs at the highest current density, as schematically shown in FIG. 2. Consequently, burning of the electrically operated propellant 36 is initiated.

Location of burn may be controlled via the location of the electrodes 44, 46, e.g. where the wires forming the ignition electrode 46 are arranged. The electrodes 44, 46 may be arranged adjacent the propellant grain 26a, 28a, as shown in FIGS. 2 and 3. The electrodes 44, 46 may be embedded in the electrically operated propellant 36, such that the electrodes 44, 46 are contiguous with an outer surface 52 of the propellant grain 26a, 28a. The outer surface 52 of the propellant grain 26a, 28a extends along and is flush with the electrically operated propellant 36, such that the outer surface 52 directly touches the electrically operated propellant 36. Only the ignition electrode 46 may be embedded in the electrically operated propellant 36.

The location and intensity of a pulse ignition is also controlled via the shape and form of the electrodes 44, 46. For example, the intensity and temperature of the burn is greater adjacent the ignition electrode 46 since the ignition electrode 46 has a greater current density, which is defined as the amount of electric current per unit area of cross section. If there is a large enough disparity between current density provided by the electrodes 44, 46, burning, such as the initial burning upon initiation of electrical input, may only take place adjacent the electrode providing the highest current density, such as the ignition electrode 46 shown in FIG. 6.

The electrodes 44, 46 may be formed of wires having many different configurations. At least the ignition electrode 46 is formed of a refractory metal, such as tungsten. Other suitable materials include metals and alloys having melting points that are greater than 1200 degrees Celsius, such as molybdenum, tantalum, niobium, chromium and rhenium. Metals and alloys having melting points above 1850 degrees Celsius may be suitable, including vanadium, hafnium, titanium, zirconium, ruthenium, osmium, rhodium, and iridium. Still other materials and alloys thereof may be suitable. In exemplary embodiments, the ground plane electrode 44 may also be formed of a refractory metal or refractory alloy, or other metal, such as copper. If the ground plane electrode 44 and the ignition electrode 46 are both formed of a refractory metal or refractory alloy, the diameter of the electrode wires may be the same.

As shown in FIG. 2, one of the electrodes 44, 46 may be arranged in a cavity or groove 54 formed in the propellant grain 26a, 28a. For example, the ignition electrode 46 may be positioned in the groove 54 such that the electric field 48 is directed into the groove 54 for ignition in the groove 54. More than one groove 54 may be formed in the propellant grain 26a, 28a and the groove 54 may be formed to have any suitable shape, such as a tapering or triangular shape. In other exemplary embodiments, the groove 54 may be formed to have a planar support surface for the electrodes 44, 46. More than one electrode 44, 46 may be accommodated in the groove 54. For example, both the ground plane electrode 44 and the ignition electrode 46 may be accommodated in the groove 54. In still other embodiments, the groove 54 may have another shape, such as a circular shape. The groove 54 may also instead be formed in the propellant grain 26a, 28a.

The ground plane electrode 44 and the ignition electrode 46 may be arranged in a same plane, such as in the groove 54 or along the outer surface 52 of the propellant grain 26a, 28a, as shown in FIG. 3. The electrodes 44, 46 may be arranged in a plane that is parallel with the outer surface 52 of the propellant grain 26a, 28a. As shown in FIG. 2, the electrodes 44, 46 may be arranged in different planes. For example, the ground plane electrode 44 may be arranged at the outer surface 52 of the propellant grain 26a, 28a whereas the ignition electrode 46 is arranged in the groove 54 such that the ignition electrode 46 is in a different plane. If the ground plane electrode 44 and the ignition electrode 46 are arranged in the same plane, such as in FIG. 3, the electric field 48 may extend laterally across the propellant grain 26a, 28a.

In operation, the initial burning takes place only adjacent the ignition electrode 46, while initial burning may not take place at the ground plane electrode 44. The electrical input may be supplied to the ground plane electrode 44. Once the electrically operated propellant 36 is ignited, burning may take place adjacent both electrodes 44, 46. Using the disparity between the current densities provided by the electrodes 44, 46, electrical input is provided in one direction across the electrodes 44, 46 to vary the speed and intensity of the burn.

Referring back to FIG. 1, the electrical input for the electrodes 44, 46 may be controlled via a controller 60 controlling the timing and direction of the electrical input across the electrically operated propellant initiators 30, 32 from the power source 38. The controller 60 may be any suitable device, such as a processor having an algorithm suitable for controlling the power source 38. The timing and direction of the electrical input across the electrically operated propellant initiators may thus be controlled. The controller 68 may act autonomously or may be directed, such as wirelessly, via an operator. The electrically operated propellant initiator may be extinguished via stopping the application of electrical current across the initiator to ignite less than 100% of the initiator to produce a desired propulsion pulse.

The electrodes 44, 46 may be configured differently for each of the propellant grains 26a, 28a and the configuration will be dependent on the desired operation for the corresponding pulse 26, 28. The first pulse 24 may occur during which the propellant grain 24a is initially burned without using an electrically operated propellant. After the propellant grain 24a is burned up or exhausted, an electrical input is applied to the electrodes 44, 46 of the initiator 30 to ignite the electrically operated propellant 36 and subsequently the propellant grain 26a in the second pulse 26. After the propellant grain 26a is burned, another electrical input is applied to the electrodes to the electrodes 44, 46 of the initiator 32 to ignite the electrically operated propellant 36 and subsequently the propellant grain 28a in the third pulse 28. In an exemplary operation, the duration of the pulses may occur between 2 and 5 seconds and inter-pulse delays may occur between 10 and 40 seconds. Both of the initiators 30, 32 may be burned up during the corresponding pulse.

Advantageously, the gas generation system using the electrode configuration described herein may be used in a multi-pulse rocket motor in which the propellant grain is operatively isolated and ignited by the initiator 30, 32. In contrast, conventional multi-pulse rocket motors may use complicated and expensive barrier/ignitor systems. The system and method described herein are further advantageous in that the electrode configuration enables expeditious and uniform grain ignition by directing the electric field to the location at which the ignition electrode is arranged.

Figures 4, 5, 6, 7:
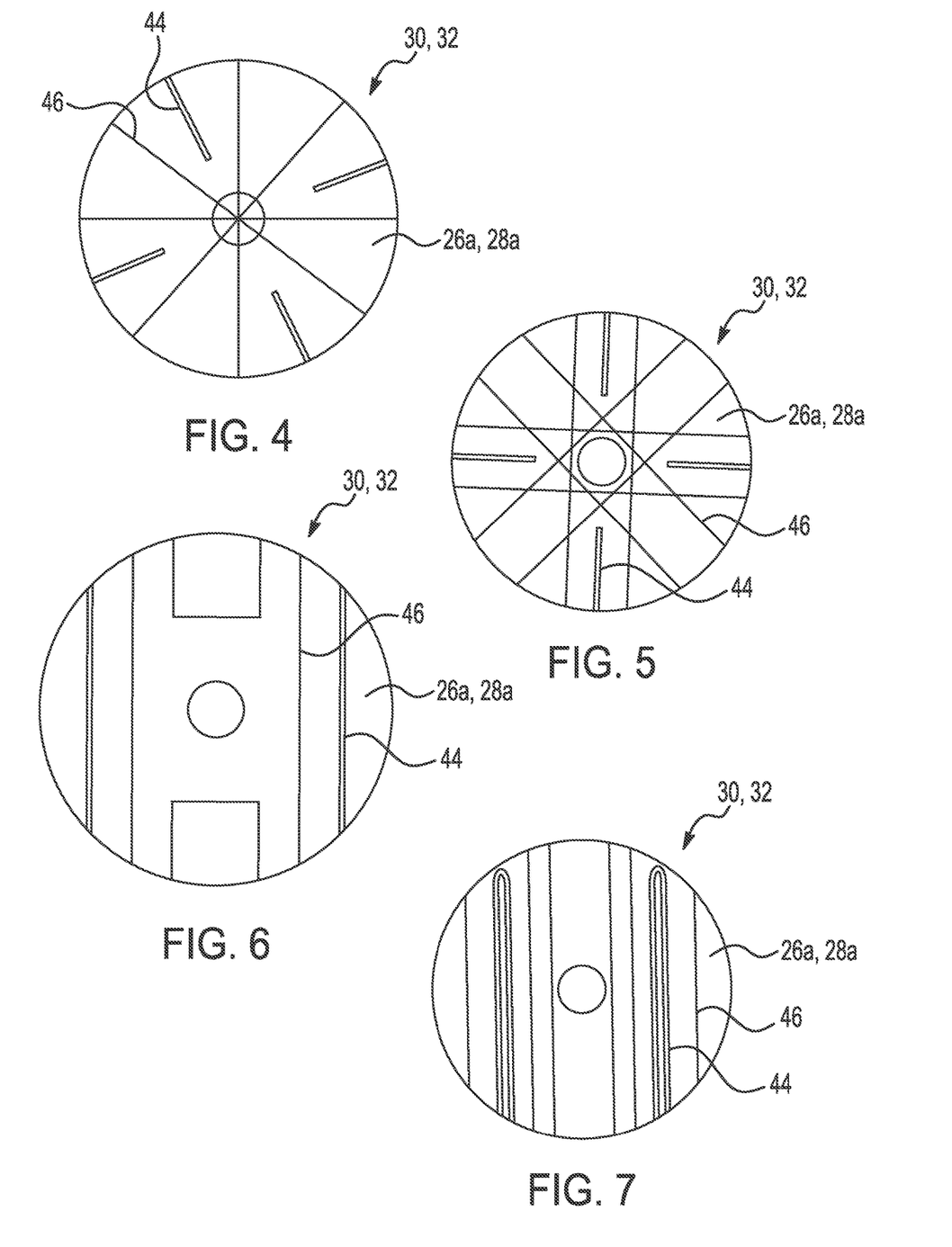
FIG. 4 shows a configuration of electrode wires for the electrically operated propellant initiator according to an exemplary embodiment of the present application.
FIG. 5 shows a configuration of electrode wires for the electrically operated propellant initiator according to another exemplary embodiment of the present application.
FIG. 6 shows a configuration of electrode wires for the electrically operated propellant initiator according to still another exemplary embodiment of the present application.
FIG. 7 shows a configuration of electrode wires for the electrically operated propellant initiator according to still another exemplary embodiment of the present application.

Referring now to FIGS. 4-7, exemplary configurations of the electrodes 44, 46 are shown. Many other configurations are possible. Each of the electrodes 44, 46 may be formed of a plurality of wires that are arranged in a particular pattern. The pattern may be an ordered and/or symmetrical pattern, or in other exemplary embodiments, the pattern may not be symmetrical. The pattern may be selected to achieve a particular burn profile. As shown in FIGS. 4 and 5, the ignition electrode 46 may include a plurality of wires that intersect and are spaced from the wires of the ground plane electrode 44 such that the wires are separated. The wires may extend radially along the electrically operated propellant 36. The surface area of the propellant grain 26a, 28a that is covered by the ground plane electrode 44 may be at least twice as large as the surface area covered by the ignition electrode 46.

As shown in FIGS. 4 and 5, the wires of the ignition electrode 46 do not intersect with the wires of the ground plane electrode 44. The wires may be arranged in zig-zag, diagonal, crisscross, rectangular, parallel, non-parallel, and/or serpentine configurations. The wires may be formed to extend in directions that are transverse to each other, as shown in FIGS. 5 and 6, or in directions that are parallel to each other, as shown in FIG. 7. The wires may be arranged to extend along an entire surface of the propellant grain 26a, 28a, such that the electric current may move across an entirety of the propellant grain 26a, 28a. In other exemplary embodiments, the wires may extend along a portion of the propellant grain 26a, 28a that is less than an entire length. Many different configurations and patterns of the wires may be possible and the configuration of the wires is dependent on the application.

Figure 8:
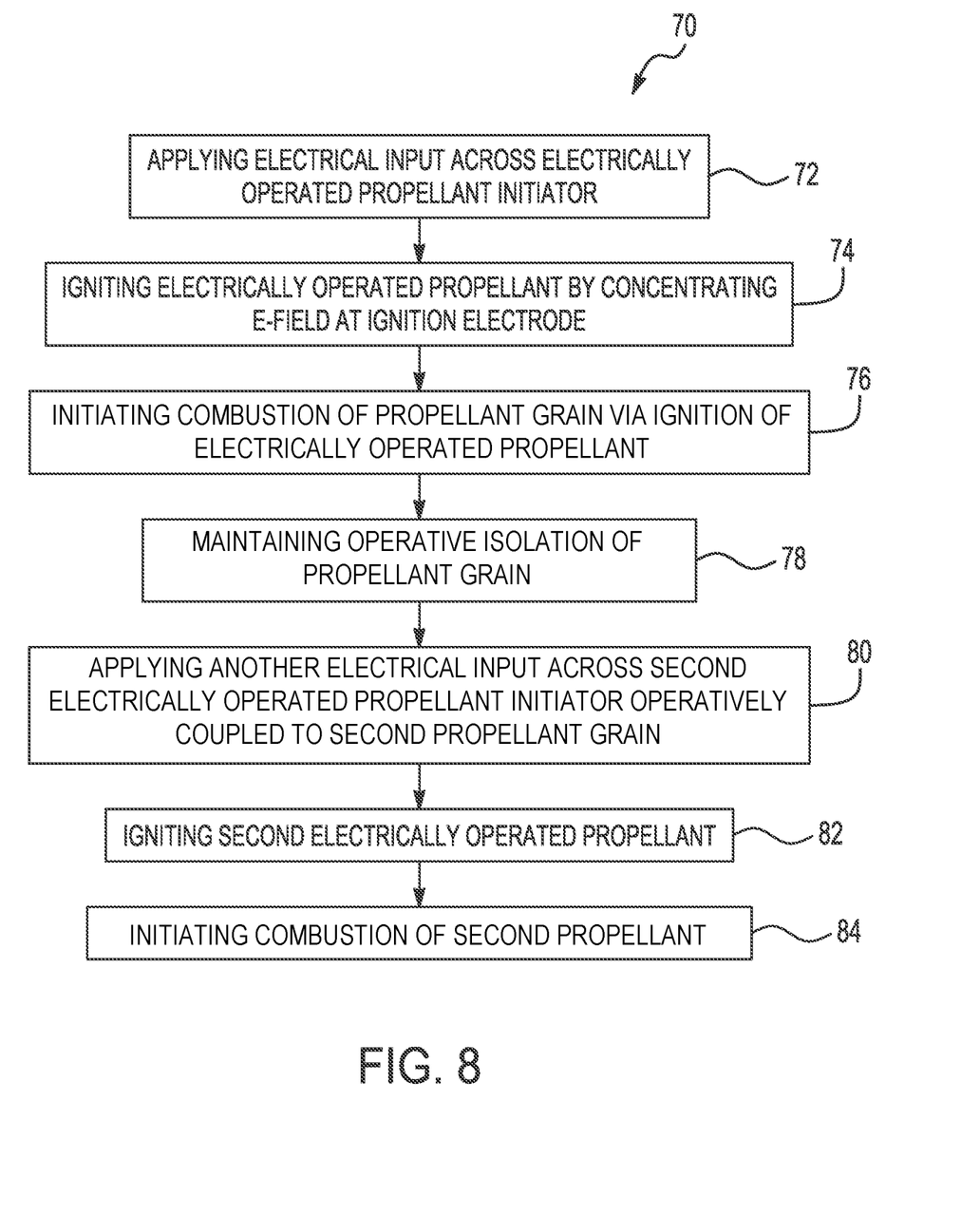
FIG. 8 shows a flowchart illustrating a method of operating a rocket motor, such as the rocket motor of FIG. 1.

Referring now to FIG. 8, a method 70 of operating a rocket motor, such as the rocket motor 12 of FIG. 1, is shown in a flowchart. Step 72 of the method 70 includes applying an electrical input across an electrically operated propellant initiator 30 that is operatively coupled to a propellant grain 26a and includes an electrically operated propellant 36 and at least one pair of electrodes 34 (shown in FIG. 1). The at least one pair of electrodes 34 includes a ground plane electrode 44 and an ignition electrode 46 at which the electric field 48 is concentrated (shown in FIG. 2) for igniting the electrically operated propellant 36 at the location where the ignition electrode 46 is located. In exemplary embodiments, the ground plane electrode 44 extends along a first surface area of the propellant grain 26a, 28a that is larger than a second surface area that the ignition electrode 46 extends along. The ignition electrode 46 has a greater current density than the ground plane electrode 44.

Step 74 of the method 70 includes igniting the electrically operated propellant 36 by the electric field 48 being concentrated at the ignition electrode 46 (shown in FIG. 2). Step 76 of the method 70 includes initiating combustion of the propellant grain 26a via igniting the electrically operated propellant 36. Step 78 of the method 70 includes maintaining operative isolation of the propellant grain 26a from a second propellant grain 28a of an auxiliary or second propulsion pulse 26, 28 for the rocket motor 12. The electrically operated propellant initiator 30 may be completely burned during the pulse.

Step 80 of the method 70 includes providing a second propulsion pulse for the rocket motor 12 by applying another electrical input across a second electrically operated propellant initiator 32 subsequent to the electrically operated propellant initiator 30 that is operatively coupled to the propellant grain 26a. The second electrically operated propellant initiator 32 is operatively coupled to the second propellant grain 28a. Step 82 of the method 70 includes igniting a second electrically operated propellant 36 of the second electrically operated propellant initiator 32. Step 84 of the method 70 includes initiating combustion of the second propellant grain 28a via igniting the second electrically operated propellant 36. The method steps may be repeated for additional pulses.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rocket motor comprising:
a combustion chamber containing at least one propellant grain; and
an electrically operated propellant initiator operatively coupled to the at least one propellant grain to initiate combustion of the at least one propellant grain, the electrically operated propellant initiator including an electrically operated propellant and at least one pair of electrodes arranged to ignite the electrically operated propellant, the at least one pair of electrodes including a ground plane electrode and an ignition electrode at which an electric field is concentrated to ignite the electrically operated propellant,
wherein the ground plane electrode extends along a first surface area of the at least one propellant grain that is larger than a second surface area of the at least one propellant grain along which the ignition electrode extends, wherein a ratio of the first surface area to the second surface area is at least 2:1; and
wherein the first surface area and the second surface area are along an interface between the electrically operated propellant and a propellant grain of the at least one propellant grain.

2. The rocket motor according to claim 1, wherein the ignition electrode has a greater current density than the ground plane electrode.

3. The rocket motor according to claim 1, wherein the ground plane electrode is formed of wires having a first diameter that is larger than a second diameter of wires forming the ignition electrode.

4. The rocket motor according to claim 1, wherein the at least one pair of electrodes are formed of a plurality of wires having a zig-zag, diagonal, crisscross, rectangular, parallel, non-parallel, or serpentine arrangement.

5. The rocket motor according to claim 1, wherein the at least one pair of electrodes are separately arranged without crossing each other.

6. The rocket motor according to claim 1, wherein the at least one propellant grain has at least one cavity in which at least one of the ignition electrode and the ground plane electrode is arranged.

7. The rocket motor according to claim 1, wherein the ignition electrode and the ground plane electrode are oriented along and within a plane that is parallel with an outer surface of the at least one propellant grain.

8. The rocket motor according to claim 1, wherein the ignition electrode and the ground plane electrode are arranged in different planes.

9. The rocket motor according to claim 1, wherein the ignition electrode is formed of a refractory metal or refractory alloy.

10. The rocket motor according to claim 1, wherein the rocket motor is a multi-pulse rocket motor and the at least one propellant grain includes a first propellant grain and a second propellant grain that is burned during a second pulse of the multi-pulse rocket motor, the second propellant grain being operatively isolated from the first propellant grain via the electrically operated propellant initiator whereby the first propellant grain and the second propellant grain are individually initiated.

11. The rocket motor according to claim 10, wherein the at least one propellant grain includes a third propellant grain that is burned during a third pulse of the multi-pulse rocket motor, the third propellant grain being operatively isolated from the second propellant grain via another electrically operated propellant initiator.

12. The rocket motor according to claim 1, wherein the electrically operated propellant is configured to transition from an unignited state to an ignited state when electrical input is applied across the electrically operated propellant initiator, and is configured to maintain the unignited state when the electrical input is not applied.

13. The rocket motor according to claim 1 further including a power source and a pair of leads extending from the power source to the electrically operated propellant initiator.

14. A multi-pulse rocket motor comprising:
a first pulse containing a first propellant grain;
a second pulse containing a second propellant grain operatively isolated from the first propellant grain; and
at least one electrically operated propellant initiator configured to isolate the first propellant grain and the second propellant grain, the at least one electrically operated propellant initiator being configured to initiate combustion of the first propellant grain or the second propellant grain;
the at least one electrically operated propellant initiator including an electrically operated propellant and at least one pair of electrodes that are configured to ignite the electrically operated propellant, the at least one pair of electrodes including a ground plane electrode and an ignition electrode, the ground plane electrode extending along a first surface area of the second propellant grain that is larger than a second surface area of the second propellant grain along which the ignition electrode extends, the ignition electrode having a greater current density than the ground plane electrode whereby an electric field is concentrated at the ignition electrode, wherein a ratio of the first surface area to the second surface area is at least 2:1; and
wherein the first surface area and the second surface area are along an interface between the electrically operated propellant and a propellant grain of the at least one propellant grain.

15. The multi-pulse rocket motor according to claim 14 further comprising a third pulse containing a third propellant grain operatively isolated from the first propellant grain and the second propellant grain, wherein the at least one electrically operated propellant initiator includes a first electrically operated propellant initiator configured to isolate the first propellant grain and the second propellant grain and a second electrically operated propellant initiator configured to isolate the second propellant grain and the third propellant grain.

16. A rocket motor comprising:
a combustion chamber containing at least one propellant grain; and
an electrically operated propellant initiator operatively coupled to the at least one propellant grain to initiate combustion of the at least one propellant grain, the electrically operated propellant initiator including an electrically operated propellant and at least one pair of corresponding electrodes arranged to cooperate together to ignite the electrically operated propellant, the at least one pair of corresponding electrodes including a ground plane electrode and an ignition electrode at which an electric field is concentrated to ignite the electrically operated propellant,
wherein the at least one propellant grain has at least one groove that is formed in the at least one propellant grain and in which the ignition electrode is arranged, the ground plane electrode being arranged outside the groove, wherein the electric field is directed into the groove for ignition in the groove.

* * * * *